(12) United States Patent
Göransson

(10) Patent No.: US 6,194,801 B1
(45) Date of Patent: Feb. 27, 2001

(54) DEVICE FOR LIMITING SHAFT WHIRL

(75) Inventor: Bo Göransson, Göteborg (SE)

(73) Assignee: SKF Nova AB, Gothenburg (SE)

(*) Notice: Subject to any disclaimer, the term of this patent is extended or adjusted under 35 U.S.C. 154(b) by 0 days.

(21) Appl. No.: 09/419,062

(22) Filed: Oct. 15, 1999

(30) Foreign Application Priority Data

Oct. 15, 1998 (SE) ................................................. 9803537-1

(51) Int. Cl.[7] ..................... H02K 310/90; F16C 389/102
(52) U.S. Cl. .......................................... 310/90.5; 384/102
(58) Field of Search .............................. 310/90.5; 384/102

(56) References Cited

U.S. PATENT DOCUMENTS

| | | | |
|---|---|---|---|
| 4,629,261 | * 12/1986 | Eiermann | 310/90.5 |
| 4,934,781 | * 6/1990 | Kato | 310/90.5 |
| 5,126,612 | * 6/1992 | Girault | 310/90.5 |

FOREIGN PATENT DOCUMENTS

| | | |
|---|---|---|
| 0 287 440 | 10/1988 | (EP) . |
| 0 499 309 | 8/1992 | (EP) . |
| 0 499 310 | 8/1992 | (EP) . |
| 0 584 846 | 3/1994 | (EP) . |

* cited by examiner

*Primary Examiner*—Clayton LaBalle
*Assistant Examiner*—Karen B Addison
(74) *Attorney, Agent, or Firm*—Burns, Doane, Swecker & Mathis, L.L.P.

(57) ABSTRACT

An arrangement for limiting the whirl speed of a shaft after failure of a magnetic bearing supporting the shaft. The arrangement includes a surface extending essentially radially from the shaft axis and a machine element is provided with a projecting element extending from the machine element in a direction towards the surface. The surface is provided with a circular element that is concentric with the axis of the shaft. The arrangement also includes a disk-like element provided with an outer perimeter surface, a hole and an inner perimeter surface. One of the perimeter surfaces is designed so that it provides a varying distance along the circumferential direction with respect to the rotational center of the disk-like element. The element is arranged between the shaft and the circular element. The circular element and the projecting element are positioned in a common plane perpendicular to the shaft so that the circular element and the projecting element overlap one another. The disklike element operates as a whirl speed limiting mechanism causing a contribution to the whirl velocity at impact between any of the projecting element, the disk-like element, the circular element and the shaft.

26 Claims, 3 Drawing Sheets

DEVICE FOR LIMITING SHAFT WHIRL

This application is based on and claims priority under 35 U.S.C. § 119 with respect to Swedish Application No. 9803537-1 filed on Oct. 15, 1998, the entire content of which is incorporated herein by reference.

FIELD OF THE INVENTION

The present invention relates to a device for limiting a whirl speed of a shaft after failure of a magnetic bearing, after which failure the shaft is supported by at least one auxiliary bearing.

BACKGROUND OF THE INVENTION

An auxiliary bearing is used to support a shaft in the event of a failure of an associated magnetic bearing. When a magnetic bearing fails, the rotating shaft comes in contact with the inside of the inner ring of the auxiliary bearing, and this leads to an acceleration of the inner ring of the bearing. These contacts affect the shaft, resulting in the frictional forces. The shaft starts to whirl in the clearance between the shaft and the inner ring of the auxiliary bearing. The friction forces are directed to increase the whirling speed until the auxiliary bearing has accelerated almost to the speed of the rotating shaft. The resulting whirl speed causes a centrifugal force which can be 30–50 times the centrifugal force associated with the shaft rotating steadily about its center axis without any whirling motion. The limited contact area and cooling area often also cause temperature problems.

EP-0 499 310 A1 discloses a magnetic bearing shaft assembly having a back-up bearing to support the shaft in the event of a failure of the magnetic bearing. If the bearing portion of the back-up bearing includes a ball race, the radially outer raceway of the bearing is secured to an anchorage, such as a housing for the assembly. A low stiffness damper member in the form of an annular shaped body of resilient material is also included in the back-up bearing at a position between the bearing portion of the bearing and the anchorage. When the magnetic bearing fails and the shaft is being brought to rest by being in contact with the back-up bearing, the resilient body is in shear and the body has a lower stiffness than otherwise would be the case. Thus, any tendency for the back-up bearing and/or the anchorage to be damaged while the shaft whirl is being brought to rest is reduced because the provision of the low stiffness damper causes the shaft to have a low natural frequency of oscillation. The stiffness damper member constitutes a crucial part of the assembly.

A need exists however for a way of limiting the whirling movement of the rotatory shaft after a failure of the magnetic bearing has occurred. The problem associated with such whirling movement is particularly accentuated in the case of a vertical shaft.

SUMMARY OF THE INVENTION

The present invention provides a device which decreases the whirling motion of a shaft during a failure of a magnetic bearing. Generally speaking, the whirling motion limiting device is in the from of a disk-like element provided with an outer peripheral surface and a hole with an inner peripheral surface. At least one of the peripheral or perimeter surfaces is designed to possess a varying distance in the circumferential direction with respect to the rotational center of the element. The device is arranged between the shaft and a circular element, with the circular element and the projecting element being positioned in a common plane perpendicular to the shaft axis. The device operates as a whirl speed or motion limiting mechanism which causes a contribution to the whirl velocity at impact between any of the projecting element, the device, the circular element and the shaft.

One aspect of the invention involves an arrangement that includes a shaft whirl limiting device for limiting whirl of the shaft after failure of a magnetic bearing, after which failure the shaft is supported by at least one auxiliary bearing. The shaft possesses an axis and is provided with a surface extending substantially perpendicular to the shaft axis, and a machine element is provided with a projecting element that extends from the machine element in a direction towards the surface. The surface is provided with at least one circular element that is concentric with the axis of the shaft and that axially overlaps the projecting element, with the shaft whirl limiting device being arranged between the shaft and the circular element. The shaft whirl limiting device is in the form of a disk-shaped element provided with a through hole and possessing an outer perimeter surface and an inner perimeter surface. At least one of the perimeter surfaces is configured to define a varying distance in a circumferential direction with respect to the rotational center of the disk-shaped element. The disk-shaped element affects the whirl motion of the shaft upon impact between any of the projecting element, the disk-shaped element, the circular element and the shaft.

Another aspect of the present invention involves an arrangement limiting whirling of a shaft after failure of a magnetic bearing supporting the shaft, and after which failure the shaft is supported by at least one auxiliary bearing. The shaft has a shaft axis and is provided with a surface extending radially outwardly with respect to the shaft axis, and a machine element is provided with a projecting element extending from the machine element in a direction towards said surface. The surface is provided with at least one circular element that is concentric with the shaft axis, and a portion of the circular element axially overlaps a portion of the projecting element in a plane perpendicular to the shaft axis. A mechanism is arranged between the shaft and the circular element that causes successive contacts with the shaft to limit whirling of the shaft resulting from failure of the magnetic bearing.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein.

DETAILED DESCRIPTION OF THE PREFERRED EMBODIMENTS

The present invention provides a device for reducing or eliminating the whirling or wobbling motion of a shaft when a magnetic bearing supporting the shaft fails or ceases to function for some reason. When the magnetic bearing supporting a high speed rotating shaft ceases to operate, it is preferable that the load acting on the shaft be taken over by an auxiliary bearing so that the shaft does not drop against a stationary surface and possibly become damaged. When the rotating shaft is no longer guided by the magnetic bearing, the shaft tends not to continue rotating in the same manner about its rotational center as when the magnetic bearing was operational. Rather, the shaft tends to begin experiencing wobbling or whirling movements at its end that was previously supported by the magnetic bearing. The auxiliary bearing is designed to assume this supporting function while being brought up to the rotational speed with which the shaft was rotating at the time the magnetic bearing ceased operating. Generally speaking, the present invention is designed to cause the whirling or wobbling shaft end to bounce into or contact surrounding parts, so that such contacts cause the shaft end to increase or decrease its whirling or wobbling speed/velocity in a new direction, depending upon the parts that contact one another. The whirling or wobbling speed/velocity, or the amount of whirl or wobble, will gradually decrease as the contacts oppose one another, eventually reaching a generally steady state rotation substantially without whirling or wobbling.

Figure 1:
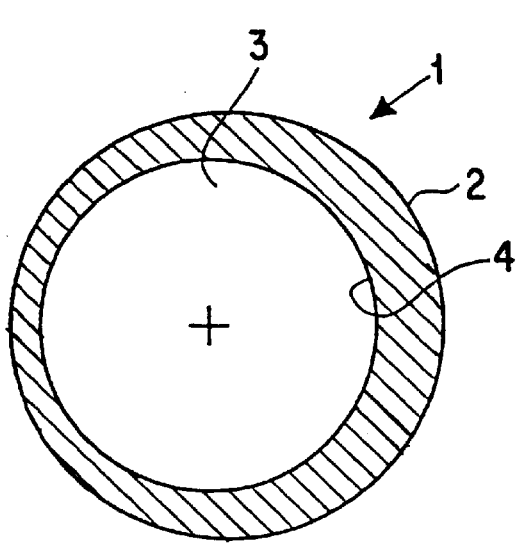
FIG. 1 is a cross-sectional view of a device for limiting the whirling or wobbling speed of a shaft after failure of a magnetic bearing in accordance with one embodiment of the present invention.

Referring initially to FIG. 1 which shows a preferred embodiment of the device 1 according to the present invention for limiting or substantially eliminating the whirl or wobble of a shaft after failure of a magnetic bearing, the device 1 includes an annularly arranged disk-like element provided with a through hole 3. The device 1 possesses an outer perimeter surface 2 and an inner perimeter surface 4. As described below in more detail, the disk-like element is capable of being arranged in different locations to accomplish the purpose and objective of the present invention.

Figure 2:
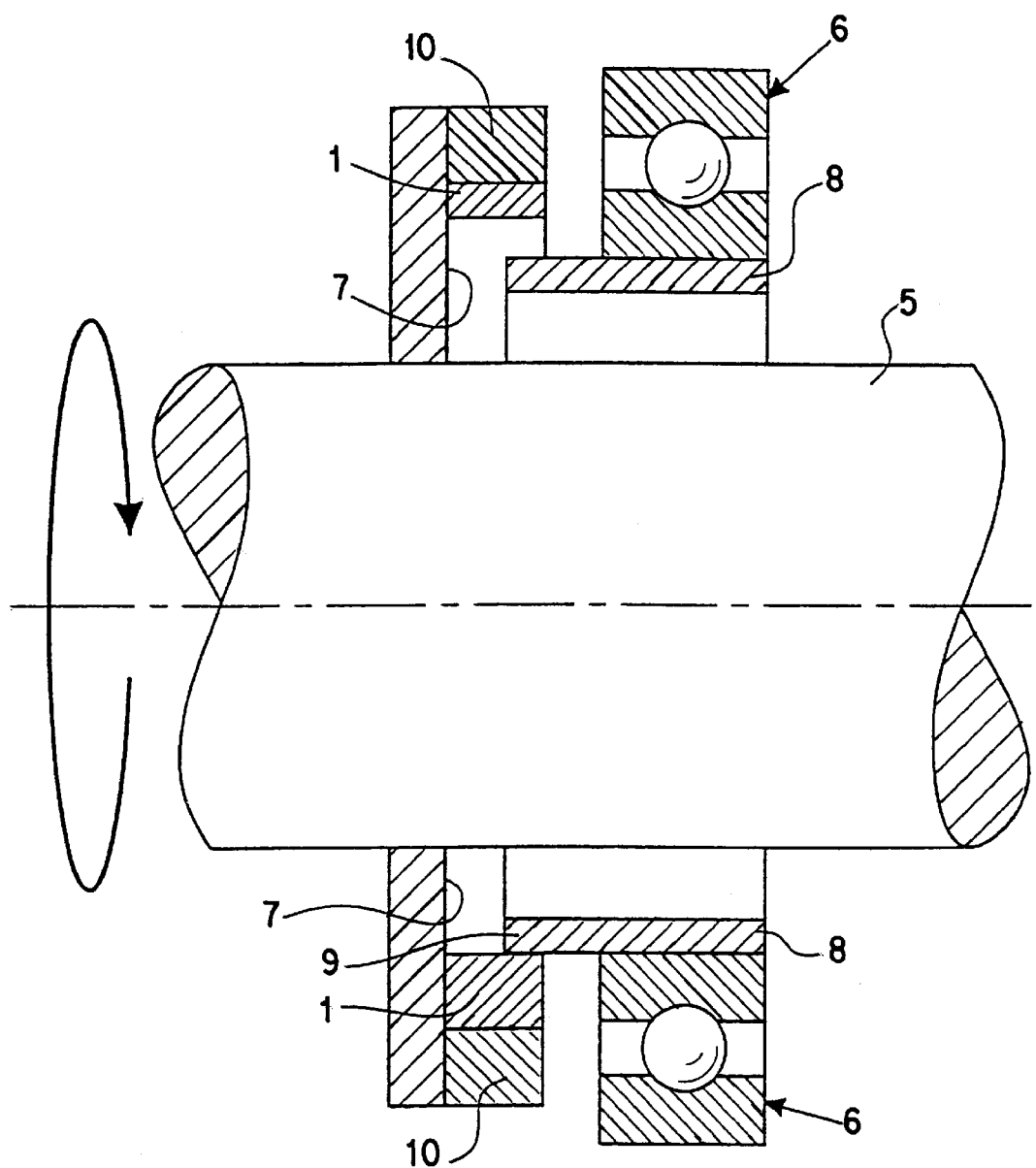
FIG. 2 is a cross-sectional view of the device shown in FIG. 1 in its operative environment.

One of these ways is presented in FIG. 2, in which the device 1 for limiting or substantially eliminating the whirl or wobble of a shaft 5 after failure of a magnetic bearing is illustrated. After failure of the magnetic bearing, the shaft 5 is normally supported by at least one auxiliary bearing 6. While the present invention is particularly useful in connection with vertically arranged shafts, it is to be understood that the present invention has useful application to other shaft arrangements or orientations.

As illustrated in FIG. 2, the shaft 5 is provided with a surface 7 that extends essentially radially from the shaft 5 and faces axially, and a machine element 8 is provided with a projecting portion 9 extending from the machine element 8 in a direction towards the radially outwardly directed surface 7. The surface 7 is provided with at least one circular element 10 that is concentric with the axis of the shaft 5 on the side facing the projecting element 9.

The annular disk-shaped element defining the device 1 in accordance with the present invention for limiting or substantially eliminating shaft whirl or wobble is configured in the manner shown in FIG. 2. At least one of the perimeter surfaces 2, 4 of the element 1 is designed to define a varying distance, along the circumferential direction, with respect to the rotational center of the device 1. In the illustrated embodiment, the device 1 is arranged between the shaft 5 and the circular element 10 as illustrated in FIG. 2. Also, portions of the circular element 10 and the projecting element 9 are positioned in a common plane oriented perpendicular to the axis of the shaft 5. That is, axially extending portions of the circular element 10 and the projecting element 9 overlap one another in the axial direction.

The device 1 is arranged to operate as a whirl speed limiting mechanism or a shafting whirl limiting mechanism causing a contribution to or an affect on the whirl velocity upon impact between any of the projecting element 9, the device 1, the circular element 10 and the shaft 5. That is, the device 1 is designed to cause the whirling or wobbling shaft 5 to bounce into or contact surrounding parts of the shaft, with such contact causing the shaft end to increase or decrease its whirling or wobbling velocity in a new direction, depending upon the parts that contact one another. The whirling or wobbling speed, or the amount of whirl or wobble, gradually decreases as the contacts between the shaft 5 and the surrounding parts oppose one another. Eventually, the shaft reaches a substantially steady state rotation with limited or substantially no whirling or wobbling movements. In this preferred embodiment shown in FIG. 2, the whirl or wobble speed is effected when the projecting element 9 comes in contact with either the shaft 5 or the disk-shaped device 1. It is thus significant in this embodiment that the projecting element 9 be arranged to be able to come in contact with the shaft 5 and the device 1.

The present invention is based on two possibilities of obtaining contact or bounce motion between the rotating parts (e.g., the shaft 5) and the initially non-rotating parts (e.g., the projecting element 9). One of these possibilities results in a decreased shaft whirl velocity and the other in an increased shaft whirl velocity. The purpose of the present invention is obtained by the sequence of consecutive contacts of the above described type. The consecutive contacts cause the shaft end to increase or decrease its whirl or wobble velocity in a new direction depending upon the parts of the arrangement that contact one another, with the amount of whirl or wobble gradually decreasing after a number of opposing contacts or bounces.

As mentioned above, different locations for arranging the whirl speed limiting device 1 in its operative environment are possible. The device 1 can be fixedly secured to one of the surfaces between the outer circular element 10 and the outside of the projecting element 9, or between the shaft 5 and the inside of the projecting element 9. In this first location, the device 1 is fixed to the inside of the circular element 10 in the manner shown in FIG. 2 and the machine element 8 is constituted by the inner ring of the auxiliary bearing 6. As the shaft whirls or wobbles, collisions occur randomly either between the inside of the device 1 and the outside of the projecting element 9, or between the outside of the shaft 5 and the inside of the projecting element 9.

Figure 5:
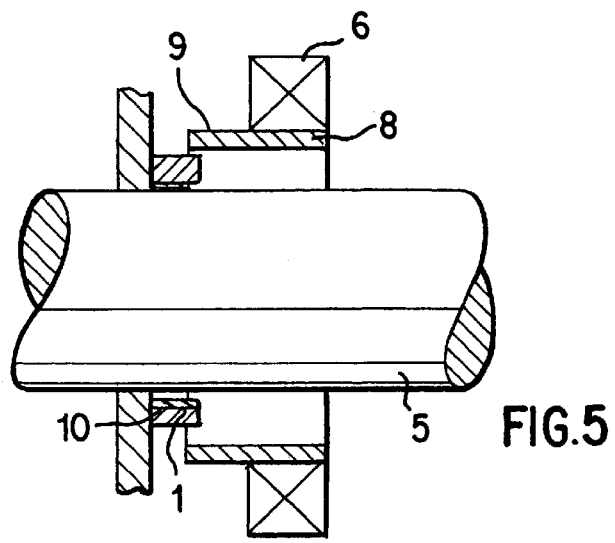
FIG. 5 is a cross-sectional view similar to FIG. 2, but with the whirl speed limiting device mounted between the projecting element and the circular element.

It should be noted that the projecting element 9 may be integrally manufactured with the inner ring of the auxiliary bearing 6. If the shaft 5 comes in contact with the inside of the protecting element 9, a negative contribution to the whirl velocity or a decrease in speed will arise. In the other case, there will be a positive contribution to the whirl velocity or an increase in speed in one direction. Thus, the whirl speed is limited. The whirl speed is the modulus of the whirl velocity, meaning that the whirl speed is a scalar quantity whereas the whirl velocity is a vector quantity comprising the whirl speed and the direction of the whirl. It should be noted that it is possible to use a plurality of the whirl speed limiting devices 1 on several of the participating parts which are relevant for obtaining the objective of the present invention instead of one, because a significant aspect of the present invention is related to the asymmetrical relation between the various parts. In the version of the present invention shown in FIG. 5, the shaft whirl limiting mechanism 1 is arranged between the shaft 5 and the inside of the projecting element 10.

It is also possible that the projecting element 9 can be arranged to engage a free end of the shaft 5. In such a case, the projecting element 9 is arranged to engage between two concentric circular elements 10, between which a whirl limiting device 1 according to the present invention is preferably arranged. Alternatively, the device 1 may be arranged on the end of the projecting element 9 in the manner shown in FIG. 8 so that the device is integrally formed in one piece with the projecting element 9.

Figure 6:
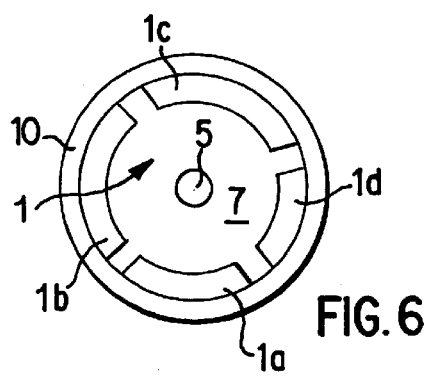
FIG. 6 is a front view of a portion of the arrangement shown in FIG. 2 in which the whirl speed limiting device is in the form of a plurality of spaced apart arcuate segments.

It is to be understood that the annularly arranged element forming the whirl speed limiting device or whirl limiting device can be reduced in its circumferential extent to at least two angular segments suitably arranged in the circumferential direction. In the case of two angular segments, the segments would be spaced apart 180 degrees. FIG. 6 illustrates an arrangement with the whirl speed limiting device 1 being in the form of four spaced apart angular segments 1a, 1b, 1c, 1d forming an annularly arranged element. The object of the segments, which may resemble a fork, is to act as a mechanism for affecting the whirl velocity. In the case of four angular segments, they are preferably arranged 90 degrees apart in the angular direction.

Figure 3:
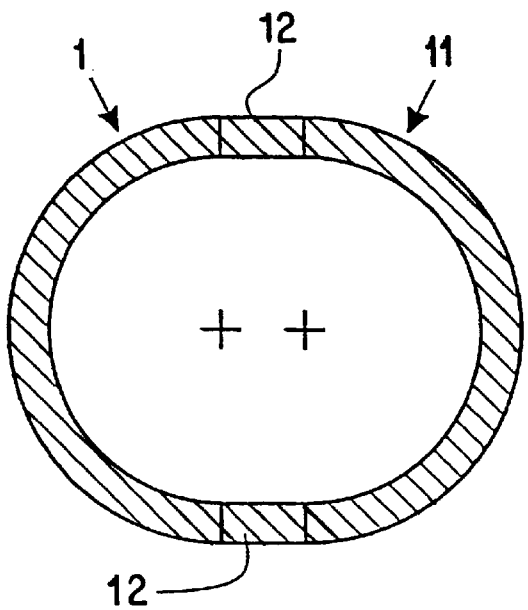
FIG. 3 is a cross-sectional view of a device for limiting the whirl speed of a shaft after failure of a magnetic bearing in accordance with another embodiment of the present invention.

FIG. 3 illustrates a second preferred embodiment of the present invention. The mechanism for producing the desired eccentricity of the shaft whirl limiting device 1 in this embodiment involves an asymmetric ring or annular element. This ring can be produced from a ring member which has been severed at two points, with the severed ends being displaced tangentially away from one another to form a space between the severed ends, and with separate members 12 being fixedly connected between the severed ends. Of course, the ring member can be severed at more than two points. An alternative way of realizing the present invention is to utilize a ring which is eccentrically arranged in relation to the center of rotation. Another way of accomplishing the effect is to use an elliptically shaped element. The whirl limiting device 1 of the present invention according to the various embodiments of the invention is thus designed so that different circumferential portions of the device are located at a different distance from the rotational center of the device.

A difference between the embodiment presented in FIGS. 1–2 and the embodiment shown in FIG. 3 is that the embodiment presented in FIG. 3 is designed to effect two contacts per revolution for the purpose of faster limiting of the shaft whirl or shaft whirl speed as compared to only one contact per revolution in the embodiment presented in FIGS. 1 and 2. Also, it is possible to design the contacting parts so that there will be even more contacts per revolution.

To limit movement in the axial direction, the projecting element 9 can be arranged to contact the radially extending surface 7. Such contact between the surface 7 and the projecting element 9, which would be possible with an arrangement such as that shown in FIG. 2, would limit the axial movement.

Figure 10:
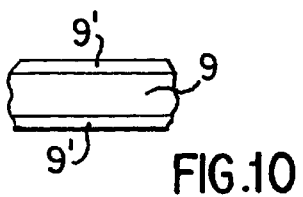
FIG. 10 is a cross-sectional view of a portion of the projecting element provided with a low friction coating on opposite surfaces.

Also, to prolong the operation of the bearing, at least one of the surfaces of the projecting element 9, the whirl speed limiting device 1, the circular element 10, the surface 7 and/or the shaft 5 can be provided with a friction decreasing means, the purpose of which is to increase the service life by decreasing wear and friction and to extend the bearing speed-up time and thereby reduce the peak temperature and bearing clearing changes. The friction decreasing means can be in the form of a friction decreasing lining or low friction coating such as PTFE or the like. FIG. 10 illustrates one form of the friction decreasing means in the form of a low friction coating provided on opposite sides of the projecting element 9 of the embodiment of the present invention shown in FIG. 2

Due to the asymmetrical features of the present invention as described in connection with FIG. 2, the arrangement needs to be properly balanced. This balance can be achieved in several ways. One way is to provide a balancing mechanism on the radial outside of the circular element 10. Another way would be to arrange holes in the element 10. Several balancing options relevant in this context are available and known to persons skilled in the art.

Figure 7:
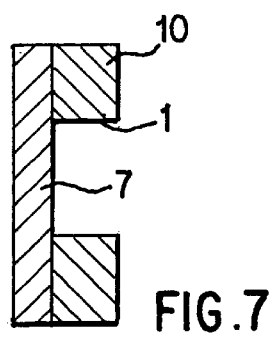
FIG. 7 is a cross-sectional view showing an embodiment of the present invention in which the whirl speed limiting device is integrally formed in one piece with the circular element.
Figure 8:
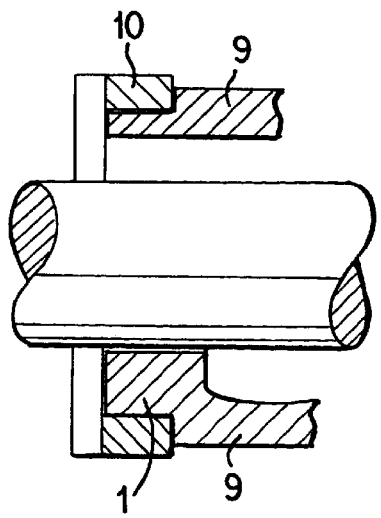
FIG. 8 is a cross-sectional view similar to FIG. 2, but with the whirl speed limiting device integrally formed in one piece with the projecting element.
Figure 9:
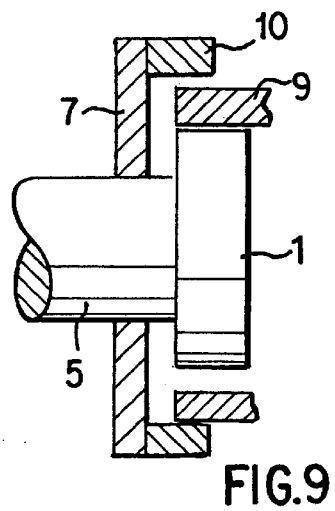
FIG. 9 is a cross-sectional view similar to FIG. 2, but with the whirl speed limiting device integrally formed in one piece with the shaft.

The present invention can be integrally manufactured in different ways. Examples include integrally manufacturing the shaft 5 and the member to which the surface 7 is arranged and integrally forming the asymmetric ring 11 with the surface 7. The circular element 10 and the device 1 can also be integrally manufactured as shown in FIG. 7. Also, the device 1 may be integrally manufactured with the projecting element 9 or one of the radially facing surfaces of the projecting element 9, an example of which is illustrated in FIG. 8. Further, the whirl limiting device 1 may be integrally manufactured with the shaft 5 as shown in FIG. 9.

Figure 4:
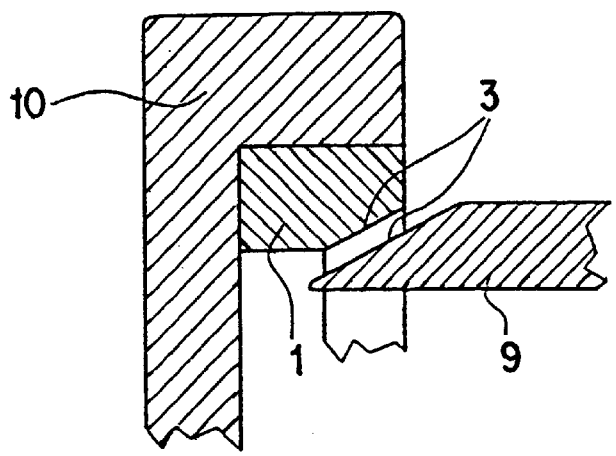
FIG. 4 is a cross-sectional view of the device according to the present invention in its operative environment, wherein the interacting surfaces are provided with conical or tapered surfaces.

FIG. 4 illustrates a further variation of the present invention. Here, this variation is illustrated as being a variation on the embodiment shown in FIG. 2. To support the shaft 5 in the axial direction after failure of the magnetic bearing, the interacting surfaces of the projecting element 9, the whirl speed limiting device 1, the circular element 10 or the shaft 5 are provided with mating portions or surfaces 13. These mating surfaces are angled or tapered as shown in FIG. 4. The purpose of these mating portions or surfaces 13 is to act as a movement limiting mechanism in one axial direction. It is of course also possible to provide mating portions allowing the movement limiting mechanism to operate in both directions by introducing concave/convex mating portions rather than the inclined surfaces shown in FIG. 4.

If is thus seen that the present invention provides a device that limits the whirl speed/velocity of the shaft, thus limiting or eliminating the shaft whirl in the event the magnetic bearing supporting the shaft ceases operation. This is achieved by configuring the device so that the whirling shaft contacts portions surrounding the shaft. As the contacts oppose one another, the whirling gradually decreases and eventually reaches a generally steady state rotation substantially without whirling.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. An arrangement comprising: a shaft whirling limiting device for limiting whirling of the shaft after failure of a magnetic bearing, after which failure the shaft is supported by at least one auxiliary bearing, the shaft possessing an axis and being provided with a surface extending substantially perpendicular to the shaft, and including a machine element provided with a projecting element that extends from the machine element in a direction towards said surface, said surface being provided with at least one circular element that is concentric with the axis of the shaft and that axially overlaps the projecting element, said shaft whirling limiting device being arranged between the shaft and the circular element, said shaft whirl speed limiting device comprising an annularly arranged element provided defining a through hole and possessing an outer perimeter surface and an inner perimeter surface, at least one of said perimeter surfaces being configured to define a varying distance in a circumferential direction with respect to a rotational center of the disk-shaped element, said annularly arranged element affecting whirling motion of the shaft at impact between any of the projecting element, the annularly arranged element, the circular element and the shaft.

2. The arrangement according to claim 1, wherein said shaft whirl speed limiting device is arranged between the shaft and an inside of the projecting element.

3. The arrangement according to claim 1, wherein said shaft whirl speed limiting device is arranged between an inside of the circular element and an outside of the projecting element.

4. The arrangement according to claim 1, wherein said shaft whirl speed limiting device is comprised of at least two angular segments arranged in a circumferential direction.

5. The arrangement according to claim 1, wherein said shaft whirl speed limiting device is a ring which is eccentrically arranged in relation to the center of rotation of the ring.

6. The arrangement according to claim 1, wherein said shaft whirl speed limiting device is a ring comprised of a ring member severed at at least one point to produce severed ends, with a separate member being fixedly connected between the severed ends.

7. The arrangement according to claim 1, wherein said shaft whirl speed limiting device and said projecting element include interacting surfaces that engage one another, said interacting surfaces being provided with mating portions that act as a movement limiting mechanism in an axial direction.

8. The arrangement according to claim 1, wherein the machine element is constituted by an inner ring of the auxiliary bearing.

9. The arrangement according to claim 1, wherein the projecting element is adapted to contact said surface in order to limit movement of the projecting element in an axial direction.

10. The arrangement according to claim 1, wherein at least one of the projecting element, the shaft whirl speed limiting device, the circular element, said surface and the shaft is provided with friction decreasing means.

11. The arrangement according to claim 1, wherein said surface is provided on a member that is integral with the shaft.

12. The arrangement according to claim 1, wherein the circular element is integrally manufactured with said surface.

13. The arrangement according to claim 1, wherein the circular element and the shaft whirl speed limiting device are integrally formed.

14. The arrangement according to claim 1, wherein the device is integrally formed with the projecting element.

15. The arrangement according to claim 1, wherein the device is integrally formed with the shaft.

16. An arrangement limiting whirling of a shaft after failure of a magnetic bearing supporting the shaft, and after which failure the shaft is supported by at least one auxiliary bearing, the shaft having a shaft axis and being provided with a surface extending radially outwardly with respect to the shaft axis, a machine element provided with a projecting element extending from the machine element in a direction towards said surface, said surface being provided with at least one circular element that is concentric with the shaft axis, a portion of said circular element axially overlapping a portion of the projecting element in a plane perpendicular to the shaft axis, and including a device arranged between the shaft and the circular element having a peripheral surface configured so that at least one circumferential portion of said peripheral surface is spaced a different distance from a rotational center of the device than another circumferential portion of said peripheral surface to cause the shaft to experience successive contacts that limit whirling of the shaft resulting from failure of the magnetic bearing.

17. The arrangement according to claim 16, wherein the device includes a disk-shaped element provided with a through hole and possessing an outer perimeter surface and an inner perimeter surface, at least one of said perimeter surfaces forming said peripheral surface and being configured so that a distance between said peripheral surface and the rotational center of the disk-shaped device varies along a circumferential extent of said peripheral surface.

18. The arrangement according to claim 16, wherein said device includes at least two angular segments arranged in a circumferential direction.

19. The arrangement according to claim 16, wherein said device is a ring which is eccentrically arranged in relation to a center of rotation of the ring.

20. The arrangement according to claim 16, wherein said device is an annular member severed at at least one point to produce severed ends, with a separate member being fixedly connected between the severed ends.

21. The arrangement according to claim 16, wherein said device is an annularly arranged element, said annularly arranged element and said projecting element including interacting surfaces that engage one another, said interacting surfaces being provided with mating portions that act as a movement limiting mechanism in an axial direction.

22. The arrangement according to claim 16, wherein the machine element is constituted by an inner ring of the auxiliary bearing.

23. The arrangement according to claim 16, wherein said surface is provided on a member that is integral with the shaft.

24. The arrangement according to claim 16, wherein the circular element is integrally manufactured with said surface.

25. The arrangement according to claim 16, wherein the circular element and said device are integrally formed as one piece.

26. The arrangement according to claim 16, wherein said device is integrally formed as one piece with the projecting element.

* * * * *